US010551849B2

(12) United States Patent
Agarwal et al.

(10) Patent No.: US 10,551,849 B2
(45) Date of Patent: Feb. 4, 2020

(54) AUTOMATED VEHICLE SIMULATED LANE-MARKING GUIDANCE SYSTEM

(71) Applicant: Aptiv Technologies Limited, St. Michael (BB)

(72) Inventors: Divya Agarwal, Sunnyvale, CA (US); Michael H. Laur, Mission Viejo, CA (US); Brian R. Hilnbrand, Mountain View, CA (US)

(73) Assignee: Aptiv Technologies Limited, St. Michael (BB)

( * ) Notice: Subject to any disclaimer, the term of this patent is extended or adjusted under 35 U.S.C. 154(b) by 170 days.

(21) Appl. No.: 15/713,824

(22) Filed: Sep. 25, 2017

(65) Prior Publication Data

US 2019/0094880 A1 Mar. 28, 2019

(51) Int. Cl.

| G05D 1/02 | (2006.01) |
|---|---|
| G06K 9/00 | (2006.01) |
| H04N 5/272 | (2006.01) |

(52) U.S. Cl.
CPC ......... *G05D 1/0274* (2013.01); *G05D 1/0246* (2013.01); *G05D 1/0278* (2013.01); *G06K 9/00798* (2013.01); *G06K 9/00825* (2013.01); *G06K 2209/27* (2013.01); *H04N 5/272* (2013.01)

(58) Field of Classification Search
CPC ............ B60W 30/12; G08G 1/096725; G08G 1/096758; G08G 1/096775; G08G 1/096783; G08G 1/167; H04N 5/272; G05D 1/0246; G05D 1/0274; G05D 1/0278; G06K 2209/27; G06K 9/00798; G06K 9/00825

USPC .......................................................... 701/23
See application file for complete search history.

(56) References Cited

U.S. PATENT DOCUMENTS

| 9,082,239 B2* | 7/2015 | Ricci | H04W 4/44 |
|---|---|---|---|
| 9,373,149 B2* | 6/2016 | Abhyanker | G06Q 50/28 |
| 10,280,054 B2* | 5/2019 | High | H04L 67/12 |
| 10,281,920 B2* | 5/2019 | Frazzoli | G08G 1/166 |
| 2008/0161986 A1* | 7/2008 | Breed | G08G 1/163 701/23 |
| 2008/0161987 A1* | 7/2008 | Breed | G08G 1/161 701/27 |
| 2010/0100268 A1* | 4/2010 | Zhang | B60W 30/09 701/25 |
| 2010/0253598 A1* | 10/2010 | Szczerba | G01S 13/723 345/7 |

(Continued)

FOREIGN PATENT DOCUMENTS

EP  3 190 022 A1  7/2017

OTHER PUBLICATIONS

European Search Report for Application No. 18196088.1, European Patent Office, dated Feb. 4, 2019.

*Primary Examiner* — Atul Trivedi
(74) *Attorney, Agent, or Firm* — Fish & Richardson P.C.

(57) ABSTRACT

A simulated-attribute guidance system for an automated vehicle includes a location-device, a digital-map, and a controller. The location-device indicates a location of a host-vehicle. The digital-map indicates a position of a simulated-attribute proximate to the location of the host-vehicle. The controller is in communication with the location-device and the digital-map. The controller is configured to operate the host-vehicle in accordance with the simulated-attribute.

14 Claims, 3 Drawing Sheets

(56) References Cited

U.S. PATENT DOCUMENTS

| | | | |
|---|---|---|---|
| 2010/0292886 A1* | 11/2010 | Szczerba | G01C 21/365 |
| | | | 701/31.4 |
| 2011/0301813 A1 | 12/2011 | Sun et al. | |
| 2015/0197248 A1* | 7/2015 | Breed | G08G 1/09626 |
| | | | 701/93 |
| 2015/0339589 A1* | 11/2015 | Fisher | B25J 9/16 |
| | | | 706/12 |
| 2016/0357187 A1* | 12/2016 | Ansari | G01S 15/931 |
| 2016/0357188 A1* | 12/2016 | Ansari | G05D 1/0212 |
| 2016/0357262 A1* | 12/2016 | Ansari | G06F 3/017 |
| 2017/0225567 A1 | 8/2017 | Tsuda | |
| 2018/0113455 A1* | 4/2018 | Iagnemma | H04W 4/70 |
| 2018/0113456 A1* | 4/2018 | Iagnemma | H04W 4/70 |
| 2018/0113457 A1* | 4/2018 | Iagnemma | H04W 4/70 |
| 2018/0113463 A1* | 4/2018 | Iagnemma | G05D 1/0061 |
| 2018/0113470 A1* | 4/2018 | Iagnemma | G05D 1/0088 |
| 2018/0188046 A1* | 7/2018 | Akiva | G01C 21/005 |
| 2018/0259967 A1* | 9/2018 | Frazzoli | G08G 1/166 |
| 2018/0259968 A1* | 9/2018 | Frazzoli | G08G 1/166 |
| 2018/0373268 A1* | 12/2018 | Antunes Marques Esteves | |
| | | | H04W 4/023 |
| 2019/0113927 A1* | 4/2019 | Englard | G01C 21/3492 |

* cited by examiner

AUTOMATED VEHICLE SIMULATED LANE-MARKING GUIDANCE SYSTEM

TECHNICAL FIELD OF INVENTION

This disclosure generally relates to a simulated-attribute guidance system, and more particularly relates to a system that operates a host-vehicle in accordance with simulated-attribute provided in a digital-map.

BACKGROUND OF INVENTION

It is known to program an automated vehicle to steer according to lane-markings on a travel-surface such as a roadway or parking lot. However, circumstances have been identified when it would be preferable to have an automated vehicle follow a travel-path that is not consistent with or in accordance with existing lane-markings, or follow a travel-path defined by a local entity when no lane-markings are present or existing lane-markings cannot be detected because, for example, the lane-markings are obscured by snow.

SUMMARY OF THE INVENTION

There are a variety of circumstances where highly-dynamic or real-time path planning by a central or local authority for a relatively small controlled area may be beneficial for orderly traffic management. Causes may include, but are not limited to, maps may not be up to date, lane-markings may be obscured, temporary obstacles may be present, complex traffic control may be required, or real-time rerouting of individual vehicles may be necessary, including placing selected vehicles in wait states. Described herein is a simulated-attribute guidance system that overlays simulated lane-markings and/or obstacle information onto guidance information. In one embodiment, the system overlays the simulated lane-markings and/or obstacle information onto camera images of a control area or controlled section of a travel surface. The images may be collected or rendered by sensors (e.g. cameras) of a central control at or associated with the controlled area. The processed images may be received and followed by the automated vehicle systems to drive within the controlled area. The central control (CC) may store previously captured images of the control area (CA) without any vehicles present in the view and use these images as a basis for boundaries of vehicle movement. The CC may maintain real-time traffic information of the current conditions of the CA by using a variety of sensors. The CC may overlay simulated lane-markings on the images of the CA. In one embodiment, the automated vehicle may register with the CC as soon as the automated vehicle enters the CA. The CC may send a starting position to the automated vehicle to start navigating the CA. The CC may then send a simulated environment around the automated vehicle that is overlaid on the image so that the automated vehicle can safely travel through the CA. The simulated lane-markings could include any type of roadway artifacts like stop sign, speed limit signs, and others. These simulated lane-markings may be ingested into the vehicle's system for perspective transformations and graphical processing. The vehicle may build trajectories with its own path planning algorithms. Non-limiting examples of the CA include intersections, parking lots, vehicle pickup areas, and drive through areas. Alternately, the CC could send the trajectories to the vehicles. Guidance information could also be based on a live video feed from the CC with only the host vehicle in it. The overlays would be seen in real-time with the vehicle position relative to the simulated lane-markings.

In accordance with one embodiment, a simulated-attribute guidance system for an automated vehicle is provided. The system includes a location-device, a digital-map, and a controller. The location-device indicates a location of a host-vehicle. The digital-map indicates a position of a simulated-attribute proximate to the location of the host-vehicle. The controller is in communication with the location-device and the digital-map. The controller is configured to operate the host-vehicle in accordance with the simulated-attribute.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
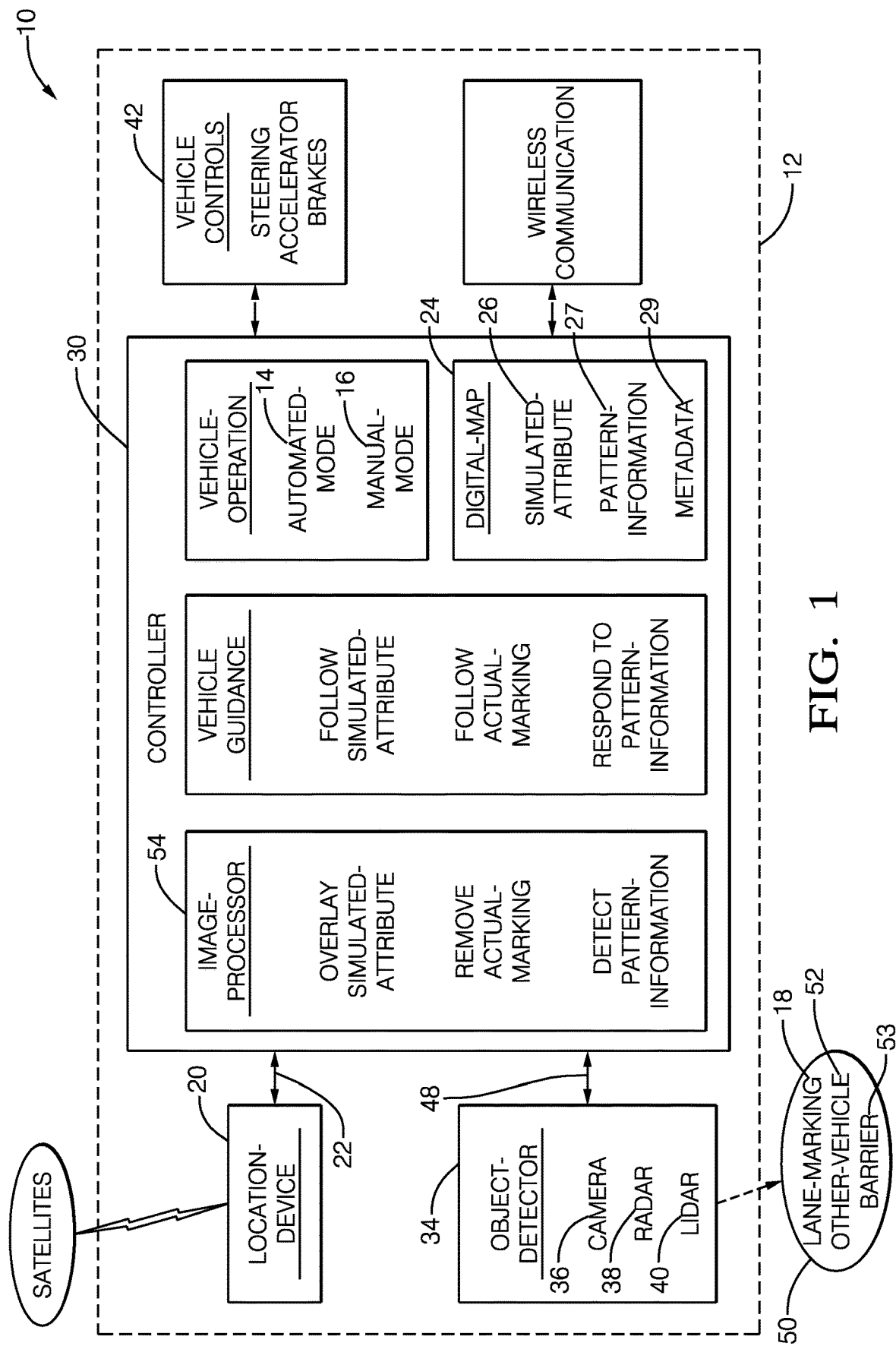
FIG. 1 is a diagram of a simulated-attribute guidance system in accordance with one embodiment.

FIG. 1 illustrates a non-limiting example of a simulated-attribute guidance system 10, hereafter referred to as the system 10, which is generally intended for use by an automated vehicle, e.g. a host-vehicle 12. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be little more than providing an audible or visual warning to the human-operator who is generally in control of the steering, accelerator, and brakes of the host-vehicle 12. For example, the system 10 may merely assist the human-operator as needed to operate the host-vehicle 12 when suitable instances of attributes such as lane-markings 18 (see also FIGS. 2 and 3) needed by the human-operator are not visible or don't exist. As will become apparent in the description that follows, the assistance to the human-operator may be in the form of displaying simulated lane-markings or other attributes to the human-operator on a typical graphical display, or projecting those simulated lane-markings or other attributes onto the windshield of the host-vehicle 12 using technology commonly known as a heads-up-display.

The system 10 includes a location-device 20 that indicates a location 22 of the host-vehicle 12. The location-device 20 may be a global-position-system (GPS) receiver that determines the location 22 based on a coordinate (latitude, longitude, elevation) of the host-vehicle 12, which may be based on signals received from satellites, as will be recognized by those in the art.

The system 10 includes a digital-map 24 that indicates a position 28 of a simulated-attribute 26 (see also FIGS. 2 and 3) proximate to the location 22 of the host-vehicle 12. The position 28 may be defined relative to the host-vehicle 12. As used herein, the simulated-attribute 26 is defined in the digital-map 24, so the simulated-attribute 26 is not actually detectably by a human-eye viewing a travel-surface proximate to the host-vehicle 12. However, for the purpose of providing steering guidance for the host-vehicle 12, the simulated-attribute 26 can be generally characterized as comparable to an actual instance of the lane-marking 18 that is actually present on a travel-surface proximate to the host-vehicle. That is, even though the simulated-attribute 26 does not physically exist as something that is physically observable around the host-vehicle 12, the simulated-attribute 26 which exists as data in the digital-map 24 may include features such as a line that defines a boundary of a travel-path 32 (FIGS. 2 and 3) for the host-vehicle 12. As will become apparent in the description that follows, the simulated-attribute 26 is particularly useful when there is a need to dynamically determine or revise the preferred travel-paths of vehicles to something other than what might already be defined by instances of the lane-markings 18 that are actually present about the host-vehicle 12.

The system 10 includes a controller 30 in communication with the location-device 20 and the digital-map 24. The controller 30 may include a processor (not specifically shown) such as a microprocessor or other control circuitry such as analog and/or digital control circuitry including an application specific integrated circuit (ASIC) for processing data as should be evident to those in the art. The controller 30 may include memory (not specifically shown), including non-volatile memory, such as electrically erasable programmable read-only memory (EEPROM) for storing one or more routines, thresholds, and captured data. The one or more routines may be executed by the processor to perform steps for determining a travel-path 32 based on information received by the controller 30 from the digital-map 24.

The system 10 may also include an object-detector 34 that may include or be formed of, but is not limited to, a camera 36, a radar 38, a lidar 40, an ultrasonic-transducer (not shown), or any combination thereof. As will be recognized by those it the art, normally the host-vehicle 12 would be operated (either by the controller 30 when in the automated-mode 14 or by the human-operator when in the manual-mode 16) using vehicle-controls 42 to follow the lane-markings 18 that are detected by the object-detector 34. However, as suggested above and will be explained in more detail below by way of non-limiting examples, the controller 30 is also configured to operate (steer, brake, accelerate) the host-vehicle 12 in accordance with the simulated-attribute 26 when desired. That is, the controller 30 may ignore instances of the lane-markings 18 detected by the object-detector 34. In the case of operation in the manual-mode 16, the human-operator may receive or be informed of the relative positions of the simulated-attribute 26 by way of any number of aforementioned display technologies.

In one non-limiting embodiment of the system 10, the camera 36 renders an image 48 of an area 50 proximate to a host-vehicle 12. The image 48 may be used by the controller 30 to determine where to steer the host-vehicle 12 based on, for example, instances of the lane-markings 18, and/or one or more instances of an other-vehicle 52, and/or one or more instances of a barrier 53, as will be recognized by those in the art. That is, the image 48 may include or consist of only real objects that are actually physically present about the host-vehicle 12. However, if for some reason it is desired that the host-vehicle follow instances of the simulated-attribute 26, either instead of or in addition to instances of the lane-markings 18, the system 10 may include an image-processor 54 configured to overlay or insert the simulated-attribute 26 onto the image 48. By this technique, the controller 30 may then determine where to steer the host-vehicle based on the modified version of the image 48, and thereby operate the host-vehicle 12 in accordance with the simulated-attribute indicated in the image, i.e. operate the host-vehicle in accordance with a modified image.

It is contemplated that in some instances the simulated-attribute 26 may correspond to, i.e. align with, and an actual instance of the lane-marking 18. This may be desirable when the lane-marking 18 is not detectable by the object-detector 34 because, for example, the lane-marking 18 is covered by snow, or the lane-marking 18 has worn away to a degree that makes it difficult to discern. This duplication of the lane-marking 18 by the simulated-attribute 26 may be used to provide a modified version of the image 48 so the controller 30 can operate the host-vehicle 12 while operating in the automated-mode 14, or the human-operator may view the modified version of the image 48 to help with operating the host-vehicle 12 while operating in the manual-mode 16.

Figure 2:
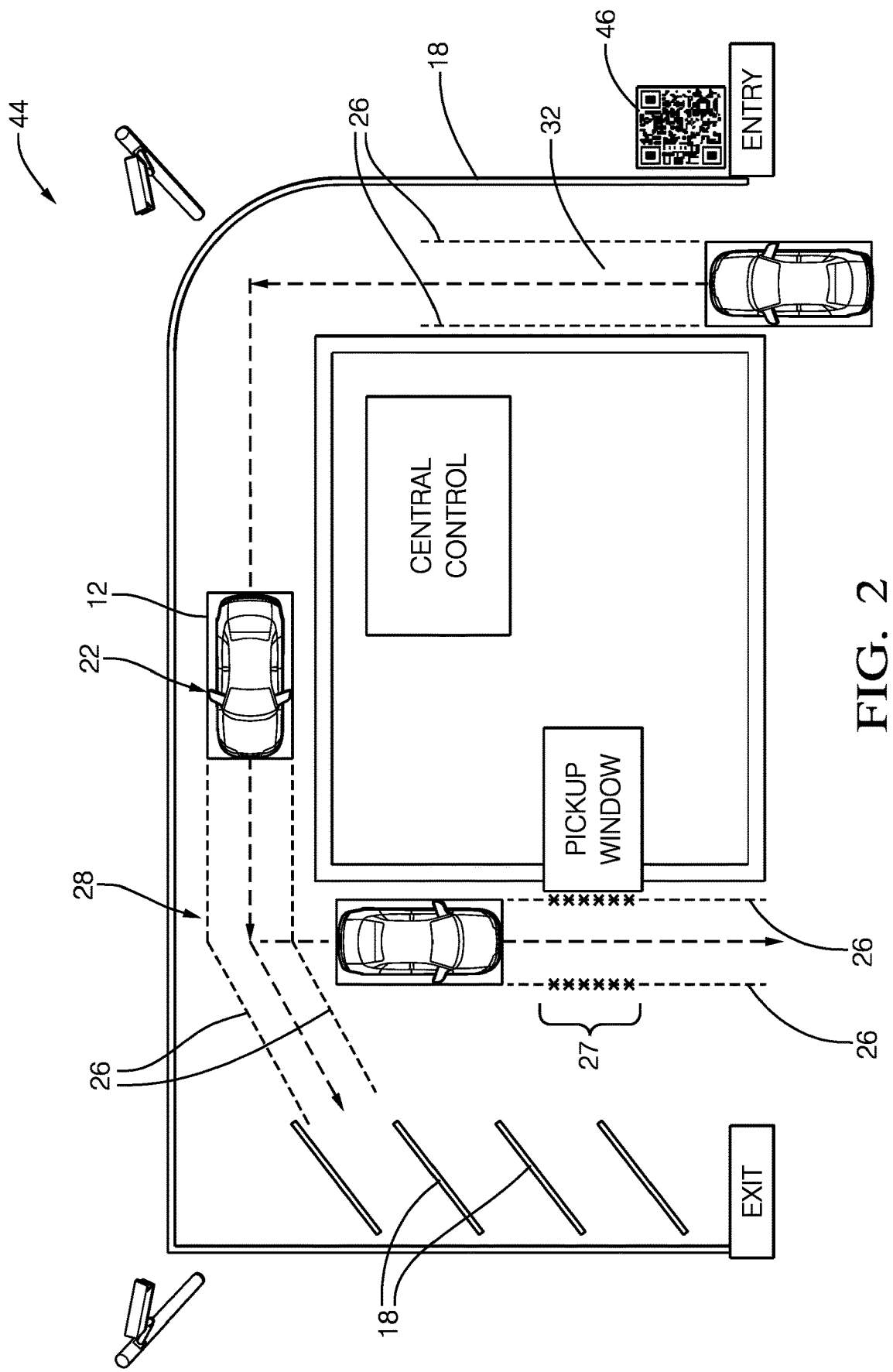
FIG. 2 is a scenario encountered by a host-vehicle operated by the system of FIG. 1 in accordance with one embodiment.

FIG. 2 illustrates a non-limiting example of a scenario 44 that the system 10 may encounter when the host-vehicle 12 travels to a fast-food business establishment. The camera 36 may be used to 'read' a QR-code 46 displayed at the entry of the establishment in order to obtain no only information regarding, for example, a menu or process by which food can be ordered and paid for, but also information regarding the position 28 of the simulated-attribute 26. It is contemplated that the simulated-attribute 26 may change each time the host-vehicle 12 travels to the establishment. For example, if what is ordered is not immediately available for pickup, the system may define instances of the simulated-attribute 26 that route the host-vehicle 12 to a waiting area (angled parking show on left) to wait until the order is ready for pickup. However, if the order is ready, the simulated-attribute 26 may route the host-vehicle 12 directly to the pickup window.

It is contemplated that in some instances the simulated-attribute 26 may include pattern-information 27 that conveys additional information regarding the simulated-attribute 26. FIG. 2 illustrates a non-limiting example the pattern-information 27 that influences how the host-vehicle 12 will operate such as stopping for a time-interval, or moving at some specified speed when the system 10 detects the pattern-information 27. The pattern-information 27 may be included or inserted in the image 48, whereby the pattern-information is detected by the image processor 54, and the controller 30 influences the path-planning for the host-vehicle 12. It is also contemplated that in some instances the simulated-attribute 26 may include metadata 29 (FIG. 1) that defines the meaning of various instances of the pattern-information 27 or the meaning of differently colored instances of the simulated-attribute 26 that is used to operate the host-vehicle 12.

Figure 3:
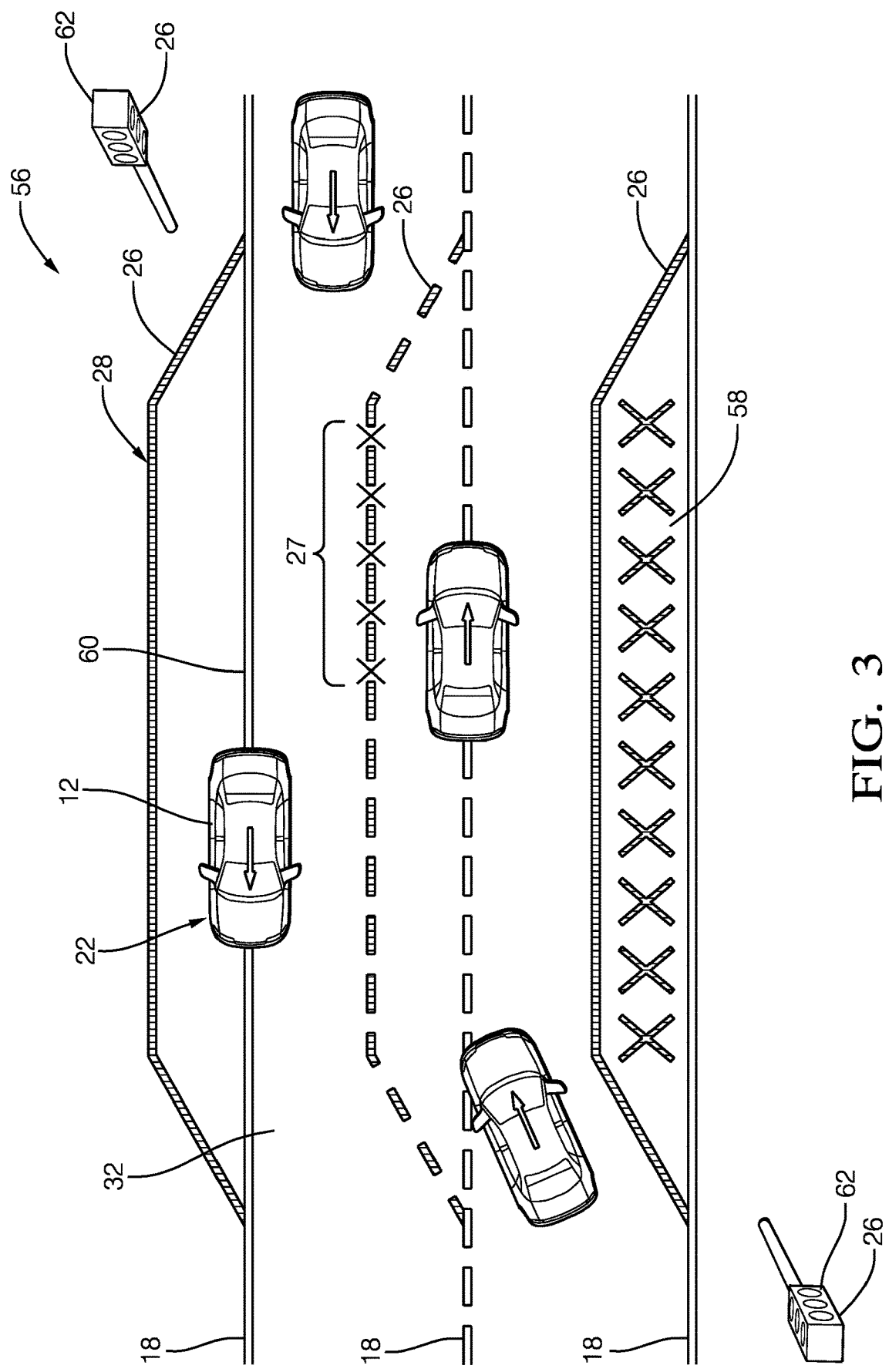
FIG. 3 is another scenario encountered by a host-vehicle operated by the system of FIG. 1 in accordance with one embodiment.

FIG. 3 illustrates another non-limiting example of a scenario 56 where the travel-path of the host-vehicle 12 is diverted to avoid a keep-out-zone 58. The presence of the keep-out-zone 58 and the simulated-attribute 26 that the host-vehicle 12 should follow may be broadcast by a transmitter (not shown) near the keep-out-zone 58 so the diversion or detour can be received by the host-vehicle 12 via wireless communication. While the controller 30 may be able to easily ignore instances of the lane-markings 18 in the image 48 while operating in the automated-mode 14, it may be difficult for the human-operator to do so while operating the host-vehicle 12 in the manual-mode 16. As such, the image-processor 54 may be advantageously configured to remove an actual-marking 60 (i.e. an actual instance of the lane-marking 18) from the image 48 that is in conflict with the simulated-attribute 26. In FIG. 3, this removal would correspond to the portions of the lane-markings 18 that are adjacent to (i.e. between the beginning and end of) the simulated-attribute 26 would be erased from the image 48 that is displayed to the human-operator, and thereby prevent potential confusion.

By way of additional example, the simulated-attribute 26 may be a traffic-signal 62. Instead of providing sufficient simulated lane-markings for two-way traffic to avoid the keep-out-zone, the simulated instance of the traffic-signal 62 may be provided to control the flow of two-way traffic using a single lane. That is, instead of the simulated-attribute 26 defining two traffic-lanes as shown in FIG. 3, the simulated lane-markings may only define a single travel lane, and the traffic-signal 62 would control which direction of the two-way traffic is authorized to use the single lane.

Accordingly, a simulated-attribute guidance system (the system 10), a controller 30 for the system 10, and a method of operating the system 10 are provided. The simulated-attribute 26 provides guidance for operating the host-vehicle 12 by the controller 30 or the human-operator when the lane-marking 18 is not detectable, or is not preferable. Communication of the simulated-attribute to the host-vehicle 12 provides a means by which detours or vehicle specific guidance can be communicated.

While this invention has been described in terms of the preferred embodiments thereof, it is not intended to be so limited, but rather only to the extent set forth in the claims that follow.

We claim:

1. A simulated-attribute guidance system for an automated vehicle, said system comprising:
a location-device that indicates a location of a host-vehicle;
a digital-map that indicates a position of a simulated-attribute proximate to the location of the host-vehicle, wherein the simulated-attribute indicates a travel-path other than what is defined by instances of lane-markings present about the host-vehicle; and
a controller in communication with the location-device and the digital-map, said controller configured to operate the host-vehicle in accordance with the simulated-attribute.

2. The system in accordance with claim 1, wherein the simulated-attribute includes a lane-marking.

3. The system in accordance with claim 1, wherein the simulated-attribute includes a traffic-signal.

4. The system in accordance with claim 1, wherein the system includes
a camera that renders an image of an area proximate to a host-vehicle; and
an image-processor configured to overlay the simulated-attribute onto the image, wherein the controller is configured to operate the host-vehicle in accordance with the simulated-attribute indicated in the image.

5. The system in accordance with claim 4, wherein the image-processor is configured to remove an actual-marking from the image that is in conflict with the simulated-attribute.

6. The system in accordance with claim 1, wherein the simulated-attribute includes pattern-information that defines a meaning of the simulated-attribute.

7. The system in accordance with claim 1, wherein the simulated-attribute includes metadata that defines a meaning of the simulated-attribute.

8. A method of operating an automated vehicle, said method comprising:
determining a location of a host-vehicle with a location-device;
receiving, from a digital-map, a simulated-attribute proximate to the location of the host-vehicle, wherein the simulated-attribute indicates a travel-path other than what is defined by instances of lane-markings present about the host-vehicle; and
operating the host-vehicle in accordance with the simulated-attribute.

9. The method in accordance with claim 8, wherein the simulated-attribute includes a lane-marking.

10. The method in accordance with claim 8, wherein the simulated-attribute includes a traffic-signal.

11. The method in accordance with claim 8, wherein the method includes
rendering an image of an area proximate to a host-vehicle; and
overlaying the simulated-attribute onto the image.

12. The method in accordance with claim 11, wherein the method includes
removing an actual-marking from the image that is in conflict with the simulated-attribute.

13. The method in accordance with claim 8, wherein the simulated-attribute includes pattern-information that defines a meaning of the simulated-attribute.

14. The method in accordance with claim 8, wherein the simulated-attribute includes metadata that defines a meaning of the simulated-attribute.

* * * * *